United States Patent [19]

Weber

[11] Patent Number: 4,509,769
[45] Date of Patent: Apr. 9, 1985

[54] VEHICLE HITCH

[76] Inventor: Arthur E. Weber, P.O. Box 1026, Weyburn, Saskatchewan, Canada, S4H 2L3

[21] Appl. No.: 442,730

[22] Filed: Nov. 18, 1982

[51] Int. Cl.³ .............................................. B60D 1/14
[52] U.S. Cl. ................. 280/491 R; 280/447; 280/456 R
[58] Field of Search ........... 280/490 R, 491 R, 491 A, 280/491 D, 456 R, 456 A, 447

[56] References Cited

U.S. PATENT DOCUMENTS

| 2,038,975 | 4/1936 | Willetts | 280/491 D |
| 2,880,016 | 3/1959 | Peterson | 280/491 R |
| 3,129,019 | 4/1964 | Bartone | 280/491 R |
| 3,235,284 | 2/1966 | Yant | 280/490 R |
| 3,738,684 | 6/1973 | Lusk | 280/491 A |
| 3,817,558 | 6/1974 | Eger | 280/491 D |

FOREIGN PATENT DOCUMENTS 606884  10/1960  Canada ........................... 280/491 R Primary Examiner—Joseph F. Peters, Jr.
Assistant Examiner—Donn McGiehan
Attorney, Agent, or Firm—Browdy and Neimark

[57] ABSTRACT

A vehicle hitch which is adjustable for extension, elevation, and lateral positioning and which has a frame of A-shape which carries a draw bar which is adjustable with respect to the frame in extension and lateral positioning. Telescoping adjustment, extending between the frame and a vehicle, enable elevation adjustment and provides for holding the frame in erect unobtrusive position on the vehicle when not in use.

7 Claims, 4 Drawing Figures

VEHICLE HITCH

The present invention relates to a vehicle hitch to provide an articulated connection between two vehicles. More particularly the present invention relates to a vehicle hitch which is selectively adjustable in respect of extension, elevation and lateral positioning and which is movable to an unobtrusive storage position on a vehicle when not in use.

In the present context, the word vehicle is intended to describe a wheeled vehicle which may or may not be self-propelled although the hitch device can also advantageously be used to draw non-wheeled structures such as harrows, stone boats and the like.

In one embodiment of use, the hitch device of the invention may be more or less permanently secured to the front or rear of a motorized vehicle such as a truck for the device of the invention when not in extended use position may be pivoted to an erect unobtrusive storage position on the vehicle where it does not interfere with normal operation of the vehicle. With such an arrangement, and when the vehicle hitch is to be used, either in a pushing or pulling capacity, the hitch need simply be lowered to operative position with minimum effort and time.

The hitch device according to the invention is selectively adjustable with respect to draw bar extension, elevation, and lateral positioning and these adjustments facilitate securement of the draw bar to a vehicle or device which is to be pushed or pulled with minimum effort.

It often occurs that the point of hitch connection between vehicles are at different levels, and the device of the invention has provision for compensating between any such differences by means enabling selected vehicle positioning of the draw bar end so that the draw bar end is held at the same horizontal level as the point of connection on the vehicle which is to be pushed or pulled. This provision is important when the vehicle being pulled is in the form of a two wheel trailer or the like, and wherein it is important that the trailer be maintained in a more or less flat or horizontal position.

Canadian Patent No. 606,884 issued Oct. 18, 1960, to R. M. Carson relates to a towing bar with a wide range hitch, and U.S. Pat. No. 2,880,016 granted Mar. 31, 1959, to C. E. Peterson relates to a combination grill guard and hitch, and the purpose of the present invention is to provide a vehicle hitch which constitutes an improvement over the invention of these earlier patents and vehicle hitch structures which are presently in use. The vehicle hitches of these two patents provide for the mounting of the hitch on a vehicle so that the hitch is pivotal about a horizontal axis in a manner generally similar to the present invention. However, neither of the structures of these patents provide any means for elevation adjustment, neither provide means for securing the draw bar in a selected lateral or side position during use. The provision of the present invention which enables the draw bar to be positioned selectively on either side of the frame and securely held in this position during use is of importance when the point of connection on the vehicle during use is of importance when the point of connection on the vehicle being pulled is not centrally positioned, or when it is desired or necessary that the vehicle being pulled be offset somewhat to one side or the other of the towing vehicle.

The main purpose of the present invention, then, is to provide a vehicle hitch which is selectively adjustable in respect of extension, elevational and lateral positioning and which permits unobtrusive storage on a vehicle when not in use.

In general terms, the present vehicle hitch relates to a frame of general A-shape, having an end cross-member and diverging legs and a central cross-member, and means to pivotally connect diverging ends of the legs to a vehicle enabling pivoting movement of the frame about a horizontal axis, and an elongate draw bar having a projecting end adjustably carried by the end and central cross-members, the end cross-member carrying a removable securing pin and the draw bar having a plurality of securing pin-receiving holes provided longitudinally therealong permitting selected extension and securement of the draw bar with respect to the end cross-member, and abutment means on the central cross-member enabling central positioning of the draw bar with respect to the frame or selected positioning of the draw bar generally parallel to one or other of the legs enabling lateral positioning of the projecting end of the draw bar, and telescoping adjustment means extending between the central cross member and the vehicle enabling selected pivoting positioning of the frame with respect to the vehicle and securement of the frame in erected storage position.

In preferred arrangement, the adjustment means extending between the central cross-member and the vehicle comprises a rod pivotally secured at one of its ends to the central cross-member, and which is telescopingly received within a tube having one of its ends pivotally secured to the vehicle, and which includes means to secure the rod and tube in selected telescoped relationship.

The present invention will now be more fully described with reference to the accompanying drawings wherein.

Reference will now be had to the accompanying drawings wherein like reference numerals refer to like parts.

Figure 1:
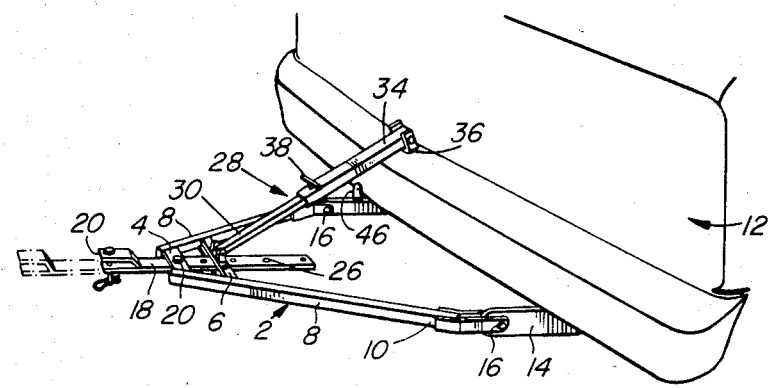
FIG. 1 illustrates in perspective view and in position for use the vehicle hitch according to the present invention.

In the drawings, numeral 2 generally designates a main frame which is of generally A-shaped configuration and which consists of an end cross-member 4, a central cross-member 6, and a pair of diverging legs 8. The members 4, 6, and 8 are all constructed of metal or metal alloy such as steel, which are securely fastened together by suitable means such as welding. As shown in the drawings, the diverging legs 8 may be of tubular stock to provide strength without weight, but it will be appreciated that these legs could be solid if desired.

The diverging ends 10 of the legs 8 are pivotally secured to a vehicle generally shown in the drawings by numeral 12. This pivoting may be accomplished by securing support arms 14 to a vehicle and preferably to the frame thereof, and by pivotally securing the diverging ends 10 to these support arms by bolts or pins 16 as shown in the drawings.

Figure 2:
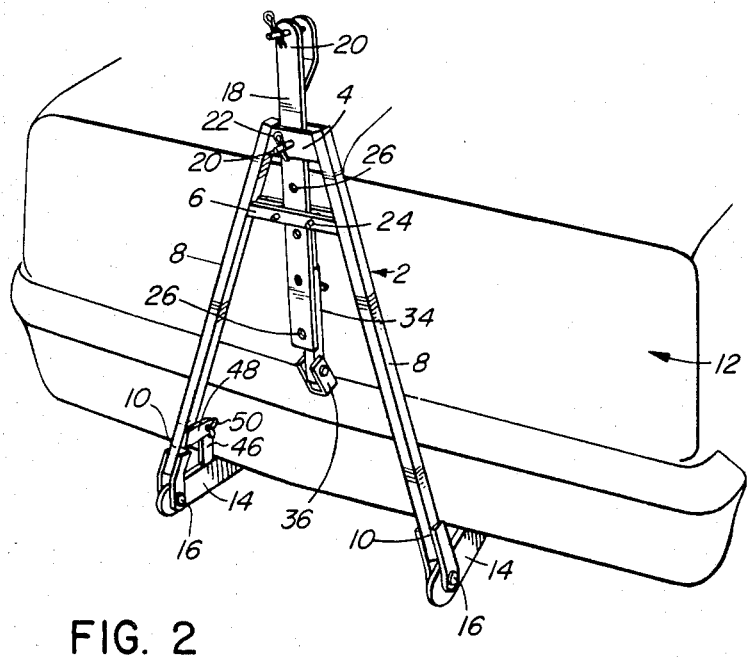
FIG. 2 illustrates the vehicle hitch according to the invention in erected storage position on a vehicle.

The accompanying drawings and particularly FIGS. 1 and 2 show the present vehicle hitch being secured to a truck or automobile but it will be appreciated that a generally similar type of attachment will be used when the hitch is to be secured to another type of vehicle such as a tractor or wagon or trailer and the like.

The main frame 2 adjustably carries a draw bar 18 which has a projecting end 20. The draw bar 18 is held in any of a number of selected positions with respect to the frame 2 by means of a removable securing pin 20. As shown in FIG. 2, this securing pin 20 is held in the end cross-member by a retaining clip 22 (or similar) but it will be appreciated that pin 20 could be in the form of a bolt having a nut and lock washer to securely hold the bolt in position.

Figure 3:
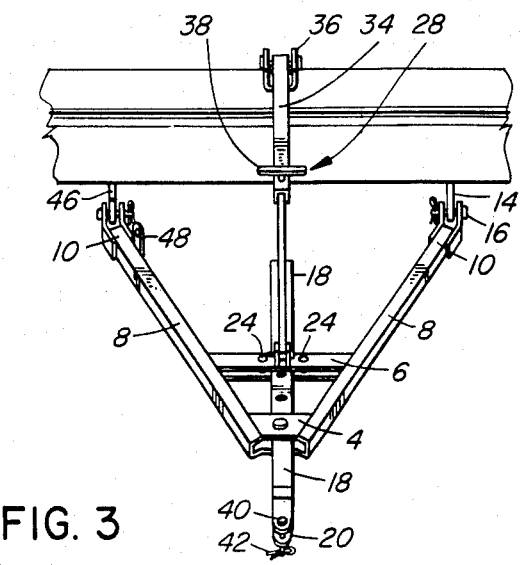
FIG. 3 illustrates in front perspective view the vehicle hitch as illustrated in FIG. 1.

The central cross-member 6 preferably consists of two spaced plates with the draw bar being positioned therebetween. As shown in FIG. 3 abutment means in the form of removable bolts or pins 24 extend between the spaced plates on each side of the draw bar 18. It will be appreciated that these removable bolts or pins 24 could be in the form of metal pieces secured as by welding between the spaced plates as desired.

By withdrawing securing pin 20, the draw bar 18 can be extended outwardly with respect to the frame, and when the desired extension is achieved, the securing pin 20 is then replaced passing through any one of a number of holes 26 provided longitudinally along the draw bar 18.

Figure 4:
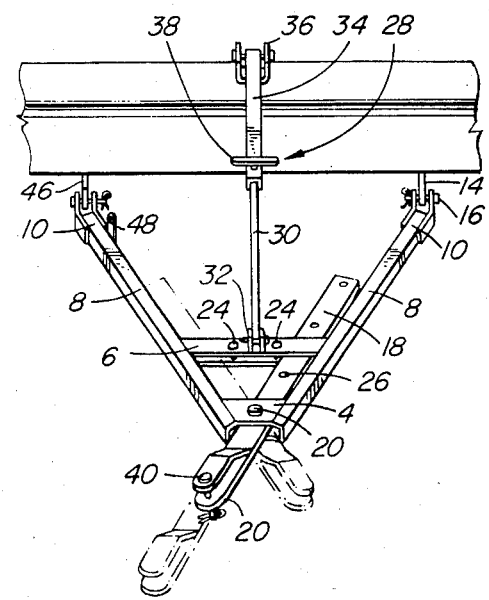
FIG. 4 illustrates in front perspective view the vehicle hitch according to the invention, and which shows in broken lines some selected positionings of the draw bar.

In addition to the extension adjustments, the projecting end 20 of the draw bar 18 may be positioned laterally on either side of the center line of the A-frame in the manner shown in full and broken lines in FIG. 4. These lateral positionings may be accomplished either by removing the securing pin 20 enabling the draw bar to be moved forwardly and then rearwardly parallel to one of the diverging legs 8, or by removing one of the removable pins 24, moving the inner end of the draw bar 18 to the desired side, and then replacing the removable pin 24.

In addition to providing extension and lateral side to side positioning, the vehicle hitch according to the invention is also adjustable with respect to elevation or vertical positioning and this is accomplished by telescoping adjustment means shown generally by numeral 28 in the drawings. In preferred construction, the adjustment means 28 consists of a rod 30 pivotally secured to central cross member 6 by a bracket 32 and accompanying pin and which rod is telescopingly received within tube 34, the end of which is pivotally secured to the vehicle (in the drawings to the bumper of the vehicle) by means of a bracket 36 secured to the vehicle and an associated pivot pin. Means are provided to selectively secure the rod and tube in desired telescoped relationship and this may consist of a T-handle 38 having a shaft threadedly received in tube 34 so that upon rotation of the handle, the shaft moves inwardly in the tube and bears against the rod 30. It will be appreciated that precise elevation of the projecting end 20 of the draw bar 18 is possible by utilizing these adjustment means. It is first necessary only to loosen the T-handle screw device 38, and then to raise or lower the frame 2 so that the projecting end of the drawbar is in desired position, and then to simply retighten the T-handle set screw.

Although not specifically shown in the drawings, means other than the T-handle arrangement could be used to selectively vary the length of the telescopic rod 30 and tube 34 adjustment means. This could be accomplished by providing bolt or pin receiving openings along the tube and rod and by inserting a locking pin or bolt through a set of aligned holes when the rod and tube are positioned in desired relationship.

Thus, it will be appreciated that the hitch according to the invention includes adjustment means enabling draw bar extension, draw bar side to side positioning and elevation all facilitating securement of the hitch to another vehicle.

When it is desired to raise the vehicle hitch to storage or non-use position, it is simply necessary to loosen clamping handle 38 and then pivot the hitch to the upright position as shown in FIG. 2, and then retighten the clamping handle so that the hitch is securely held in this upright position where it does not interfere with the normal operation of the vehicle.

The assembly may additionally be provided with means to safely and positively lock the hitch in its upright position as shown in FIG. 2. One or other (or both) of the support arms 14 may be provided with an upstanding flange 46 having a hole (not numbered) in its upper end, and the adjacent leg 8 provided with a somewhat inclined flange 48, which also is provided with a hole (not numbered). When the hitch is raised to the position as shown in FIG. 2 the holes in flanges 46 and 48 are aligned to receive a locking pin 50 as shown in FIG. 2.

In the vehicle hitch arrangement shown in the accompanying drawings, the projecting end 20 of the draw bar is shown as having a draw bolt 40 with accompanying retaining pin 42. It will be appreciated, however, that the draw bar could alternatively be provided with a trailer hitch ball in conventional fashion.

I claim:

1. A vehicle hitch which is selectively adjustable with respect to extension, elevation and lateral positioning and which is movable to erect storage position on a vehicle, and comprising a frame of general A-shape having an end cross-member and a pair of diverging legs and a central cross-member, and means to pivotally connect diverging ends of the legs to a vehicle enabling pivoting movement of the frame about a horizontal axis, and an elongate draw bar having a projecting end adjustably carried by the end and central cross members, the end cross-member carrying a removable securing pin and the draw bar having a plurality of securing pin-receiving holes provided longitudinally therealong permitting selected extension and securement of the draw bar with respect to the end cross-member, and abutment means on the central cross-member enabling central positioning of the draw bar with respect to the frame or selected positioning of the draw bar generally parallel to one or other of the legs enabling lateral positioning of the projecting end, and telescoping adjustment means extending between the central cross-member and the vehicle enabling selected pivoted positioning of the frame with respect to the vehicle and securement of the frame in erect storage position.

2. A hitch according to claim 1, wherein the central cross-member comprises two spaced plates with the draw bar being positioned therebetween, the abutment means on the central cross-member comprising bolts extending between the plates.

3. A hitch according to claim 1, wherein the central cross-member comprises two spaced plates with the draw bar being positioned therebetween, the abutment means on the central cross-member comprising metal stops welded between the two plates.

4. A hitch according to claim 1, wherein the telescoping adjustment means comprises a rod pivotally secured to the central cross-member telescopingly received within a tube pivotally secured to the vehicle, and including means to secure the rod and tube in selected telescoped relationship.

5. A hitch according to claim 4, wherein the means to secure the rod and tube comprises a T-handle threadedly carried by the tube which upon rotation bears inwardly against the rod.

6. A hitch according to claim 1, wherein the projecting end of the draw bar includes an opening to receive a draw bolt or a vehicle hitch ball.

7. A hitch according to claim 1 wherein the means to pivotally connect diverging ends of the legs to a vehicle comprise a pair of support arms secured to the vehicle, at least one of the support arms having an upstanding flange with a hole provided adjacent its upper end, and a flange provided on the adjacent diverging leg and which also has a hole, the holes being aligned upon upright positioning of the hitch to receive a locking pin to secure the hitch.

* * * * *